United States Patent
Li

(10) Patent No.: US 7,114,694 B2
(45) Date of Patent: Oct. 3, 2006

(54) LINKAGE MECHANISM FOR FOOT SEATS

(75) Inventor: Chao-Kang Li, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 96 days.

(21) Appl. No.: 11/011,195

(22) Filed: Dec. 15, 2004

(65) Prior Publication Data

US 2006/0000958 A1    Jan. 5, 2006

(30) Foreign Application Priority Data

Jun. 30, 2004    (TW) ................................ 93119780 A

(51) Int. Cl.
*F16M 11/00*    (2006.01)

(52) U.S. Cl. ................ 248/677; 248/188.8; 312/223.2; 312/351.1; 312/351.9

(58) Field of Classification Search ................ 248/677, 248/188, 188.1, 188.8, 188.9, 188.6, 188.3; 312/223.2, 351.1, 351.9

See application file for complete search history.

(56) References Cited

U.S. PATENT DOCUMENTS 5,887,962 A *  3/1999  Tsai ........................ 312/351.9
6,311,941 B1 * 11/2001  Feldmeyer ............... 248/188.8

* cited by examiner

*Primary Examiner*—Ramon O Ramirez
(74) *Attorney, Agent, or Firm*—Troxell Law Office, PLLC

(57) ABSTRACT

A linkage mechanism for foot seats comprises at least two shafts and two guide elements combined at the bottom of a housing, a foot seat is pivotally connected to each shaft, an arc rack is disposed at a relative end of each foot seat, a rack is disposed at each one of two sides of a linking rod corresponding to the arc rack of each foot seat; the racks is respectively engaged the said arc rack of each said foot seat; therefore, when one of the foot seats is rotated, the linking rod is driven to move and the other foot seats are then further driven to rotate. Whereby, the adjustment of the movable foot seats are munch more convenient and time-saving.

9 Claims, 5 Drawing Sheets

LINKAGE MECHANISM FOR FOOT SEATS

BACKGROUND OF THE INVENTION

1. Field of the Invention

The present invention relates foot seats below a housing of an electronic product such as a computer, a server or the like and particularly to a linkage mechanism for movable foot seat.

2. Description of Related Art

Please refer to FIG. 1. If the bottom face of a housing 10 of a general vertical computer is shallower and longer, it must be combined with a fixing type foot seat 11. The bigger surface of the bottom of the foot seat 11 is used to enhance the stability of the housing 10 so as to prevent the housing 10 from toppling over. But, the length of the fixing type foot seat projected out the housing cannot be adjusted to meet a user's requirement.

Please refer to FIG. 2. Another type of housing 20 is combined with four foot seats at the bottom face thereof. An arc rack 211 is disposed at the pivoting end of each foot seat 21. The racks 211 of the two adjacent foot seat 21 are engaged. A foot seat 21 rotated by a user can drive another foot seat 21 to rotate so that the length of the two foot seats 21 extended out of or retreated into the bottom of the housing 20 can be adjusted.

A set of foot seats of a computer housing disclosed in Taiwan patent No. 321,301 is a structure that several fixing masses are locked at the bottom of the computer housing, same numbers of seat sheets are clamped on the fixing masses by means of dovetail notch. The seat sheet can slide along the fixing mass and take it as a center to rotate to any angle. When the housing is horizontally laid, the foot seats can be also retreated together to attach at the bottom of the housing so that they and the housing can be allowed to be formed into one body.

Every kind of the movable foot seats mentioned above lacks a linkage mechanism on a whole to combine therewith. A user must drive the foot seat one after another and then can adjust all of the foot seats; it is time consuming in the operation. Besides, the adjustment is inconvenient to practice if the foot seats are at a place that a user's hand is difficult to touch.

SUMMARY OF THE INVENTION

For improving further the movable foot seats mentioned above that is inconvenient to be adjusted sometime or time consuming while adjusting, the present invention is proposed.

The main object of the present invention is to provide a linkage mechanism for foot seats, allowing the adjustment of the movable foot seats to be more convenient.

Another object of the present invention is to provide a linkage mechanism for foot seats, allowing the adjustment of the movable foot seats to be more time saving.

A linkage mechanism for foot seats comprises at least two shafts and a guide element combined at the bottom of a housing. An arc rack is disposed at a relative end of each foot seat; the foot seat is pivotally connected to each shaft. A rack is disposed at each one of two sides of a linking rod relative to an arc rack of each foot seat; the racks are respectively engaged with each arc rack of the foot seat. When one of the foot seats is rotated, the linking rod is driven to move and the other foot seats are further driven to rotate. Guide elements corresponding to the guide elements on the housing are disposed in the linking rod so as to cause the movement of the linking rod to be limited by the guide elements.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
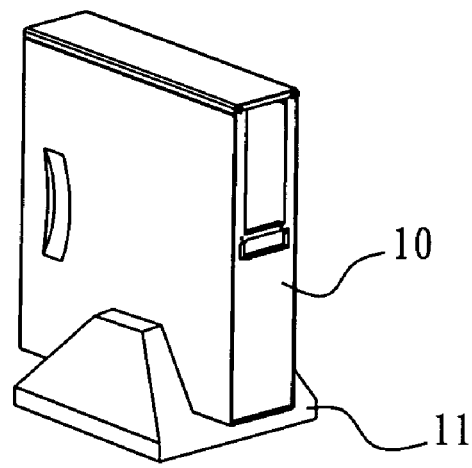
FIG. 1 is a prospective view, showing a conventional fixing type foot seats combined with a housing.
Figure 2:
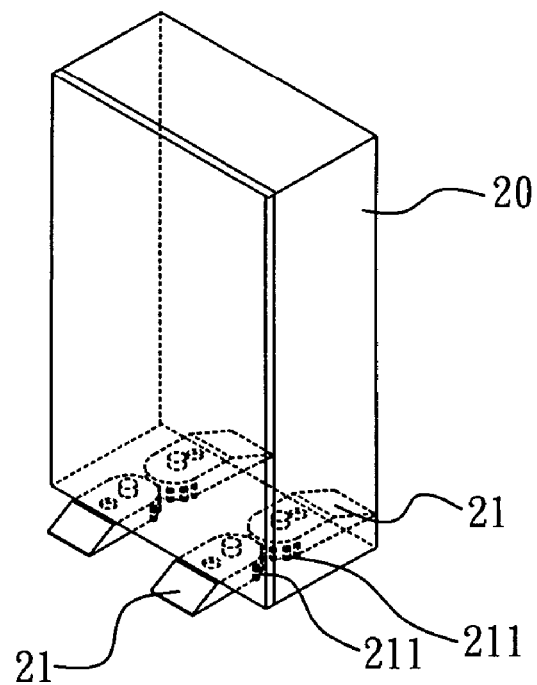
FIG. 2 is a prospective view, showing a conventional movable type foot seats combined with a housing.
Figure 3:
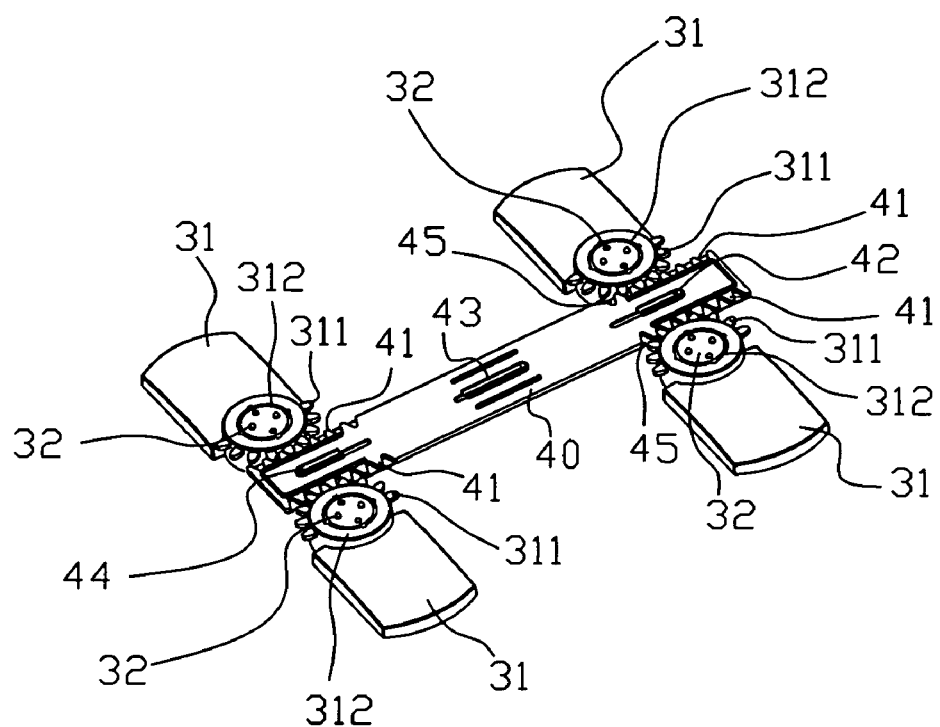
FIG. 3 is a prospective view, showing expanded foot seats of a preferred embodiment according to the present invention.
Figure 4:
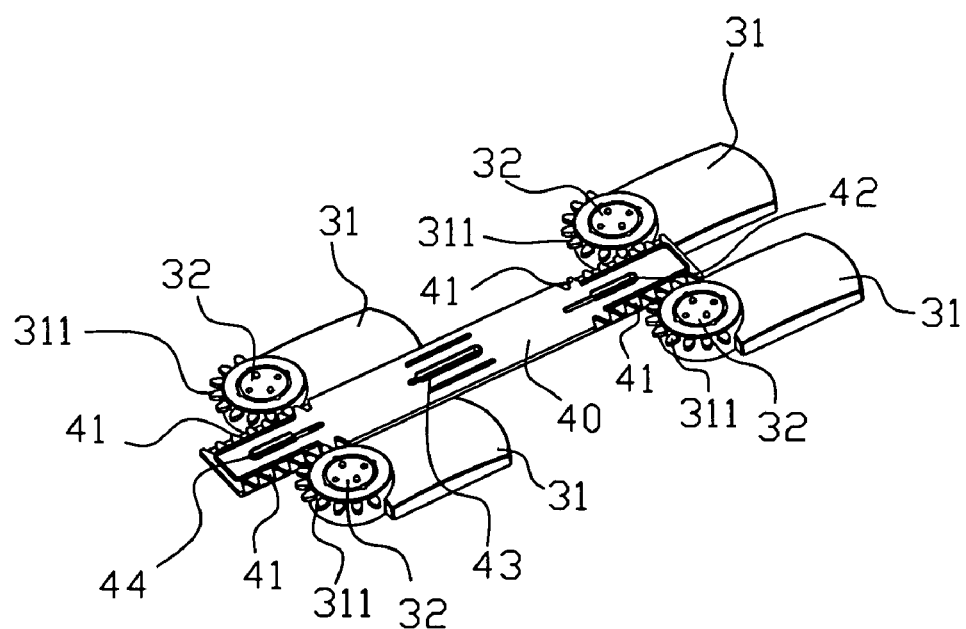
FIG. 4 is a prospective view, showing retreated foot seats of a preferred embodiment according to the present invention.

First, please refer to FIGS. 3 and 4. According to a preferred embodiment of the present invention, a linkage mechanism for foot seats comprises four foot seats 31 and a linking rod 40. An arc rack 311 and pivoting hole 312 are disposed at each end of the foot seat 31. The pivoting hole 312 is pivotally connected to a shaft 32. The foot seat 31 can be driven taking the shaft 32 as a center to rotate. Two racks 41 engaged with the arc racks 311 of the foot seats 31 are respectively disposed at the two sides of the linking rod 40. A plate 45 is used to shield one side face of each rack 41, but it is not indispensable. Besides, three long holes 42, 43 and 44 are opened in the linking rod 40 and the four foot seats 31 are respectively engaged with the linking rod 40 at the same time. Therefore, only any one of the foot seats 31 is rotated, the linking rod 40 is driven to move and then other three foot seats 31 are further driven by the linking rod 40 to rotate. FIG. 3 and 4 respectively show the states that the four foot seats 31 are extended and retreated.

Figure 5:
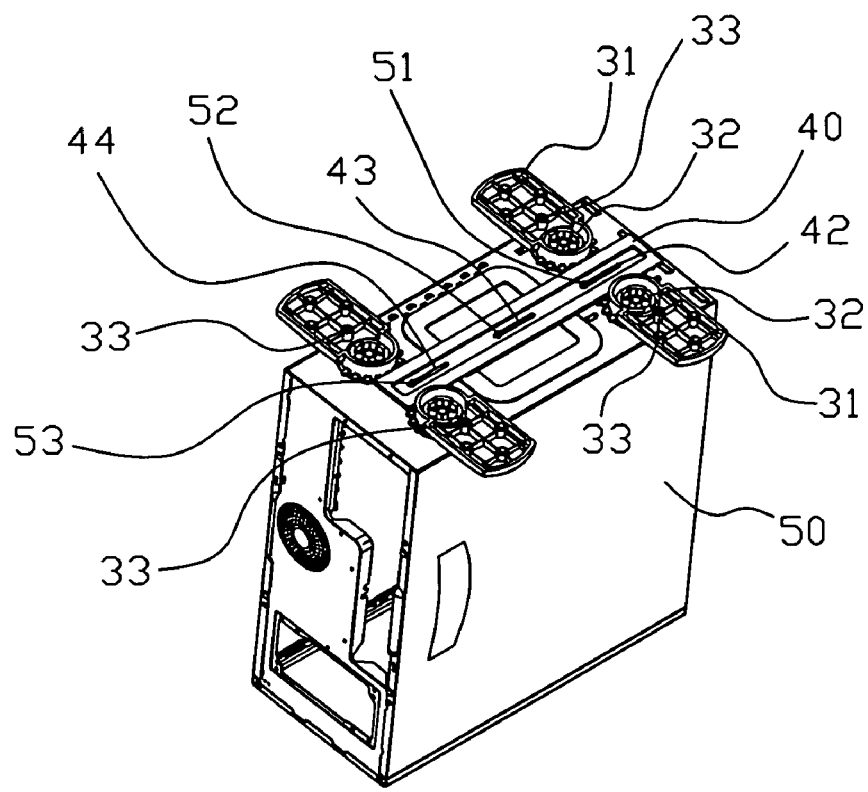
FIG. 5 is a prospective view, showing expanded foot seats combined with a housing of a preferred embodiment according to the present invention.
Figure 6:
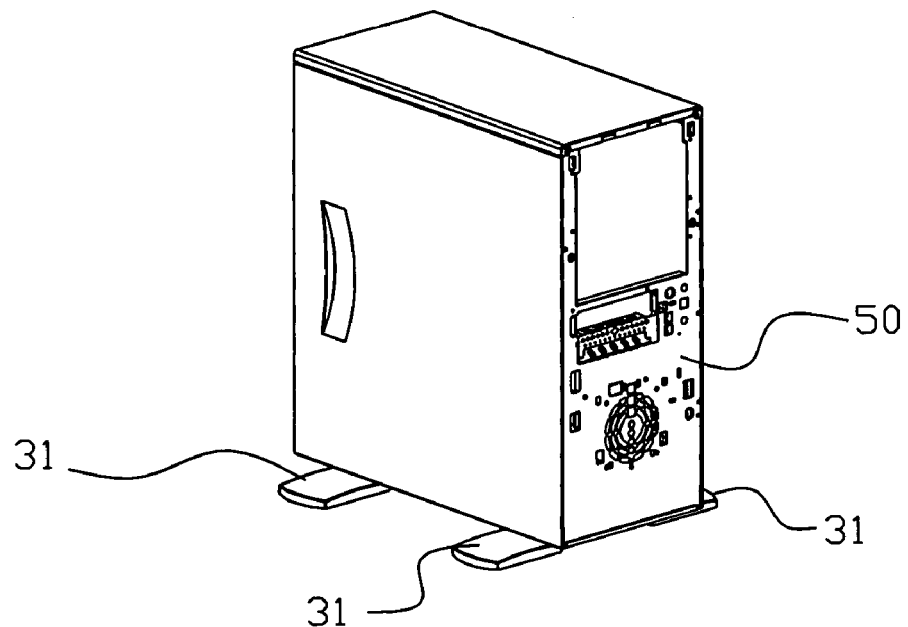
FIG. 6 is another prospective view, showing expanded foot seats combined with a housing of a preferred embodiment according to the present invention.
Figure 7:
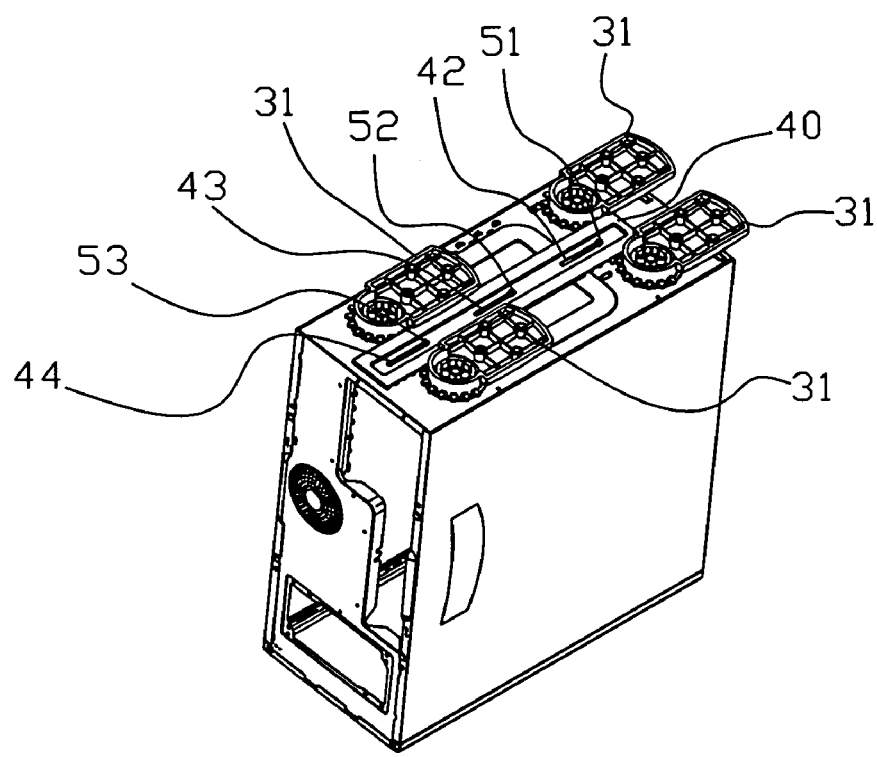
FIG. 7 is a prospective view, showing retreated foot seats combined with a housing of a preferred embodiment according to the present invention.
Figure 8:
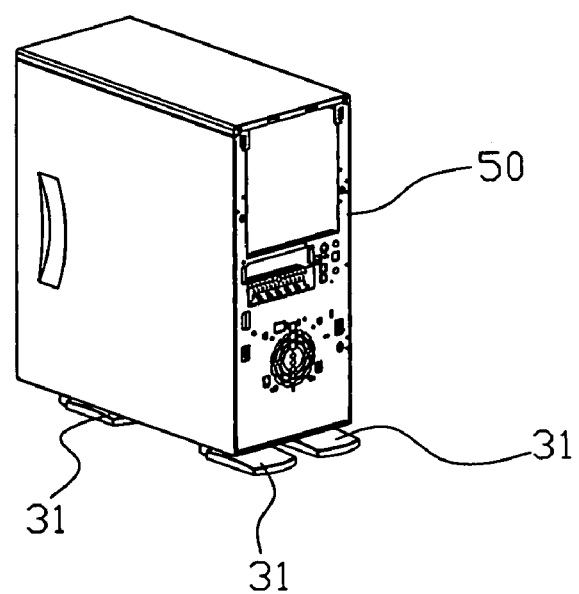
FIG. 8 is another prospective view, showing retreated foot seats combined with a housing of a preferred embodiment according to the present invention.

Please refer to FIGS. 5–8. The four shafts 32 are respectively connected at the proper positions of the bottom face of the housing 50 to cause the four foot seats 31 to be combined to the bottom face of the housing 50, but the shafts 32 can be taken as centers for the foot seats 31 to rotate freely in the range of a certain degree of angle. Three screws 51, 52 and 53 are combined at the locations on the bottom face of the housing 50 corresponding to the three long holes 42, 43 and 44 in the linking rod 40. The head portions of the three screws 51, 52 and 53 are respectively disposed outside of the three long holes 42, 43 and 44, the parts of them below the head portions are stayed in the holes to cause the linking rod 40 not to be extended from the bottom face of the housing 50 but to be able to be moved to and fro. The length of the three long holes 42, 43 and 44 is the length that the linking rod 40 can be moved. As FIGS. 5 and 6 show, when the four foot seats 31 are extended, the three screws 51, 52 and 53 are just propped respectively against the leftmost sides of the three long holes 42, 43 and 44 to limit the linking rod 40 not to move rightward. And, as FIGS. 7 and 8 show, when the four foot seats 31 are retreated, the three screws 51, 52 and 53 are just propped respectively against the rightmost sides of the three long holes 42, 43 and 44 to limit the linking rod 40 not to move leftward. The three screws 51, 52 and 53 limit not only the range of the to-and-fro movement of the linking rod 40 but also the linear movement thereof. Besides, a pad 33 can be installed at the bottom of each foot seat 31 to allow the contact between the foot seat 31 and a floor is more stable.

Figure 9:
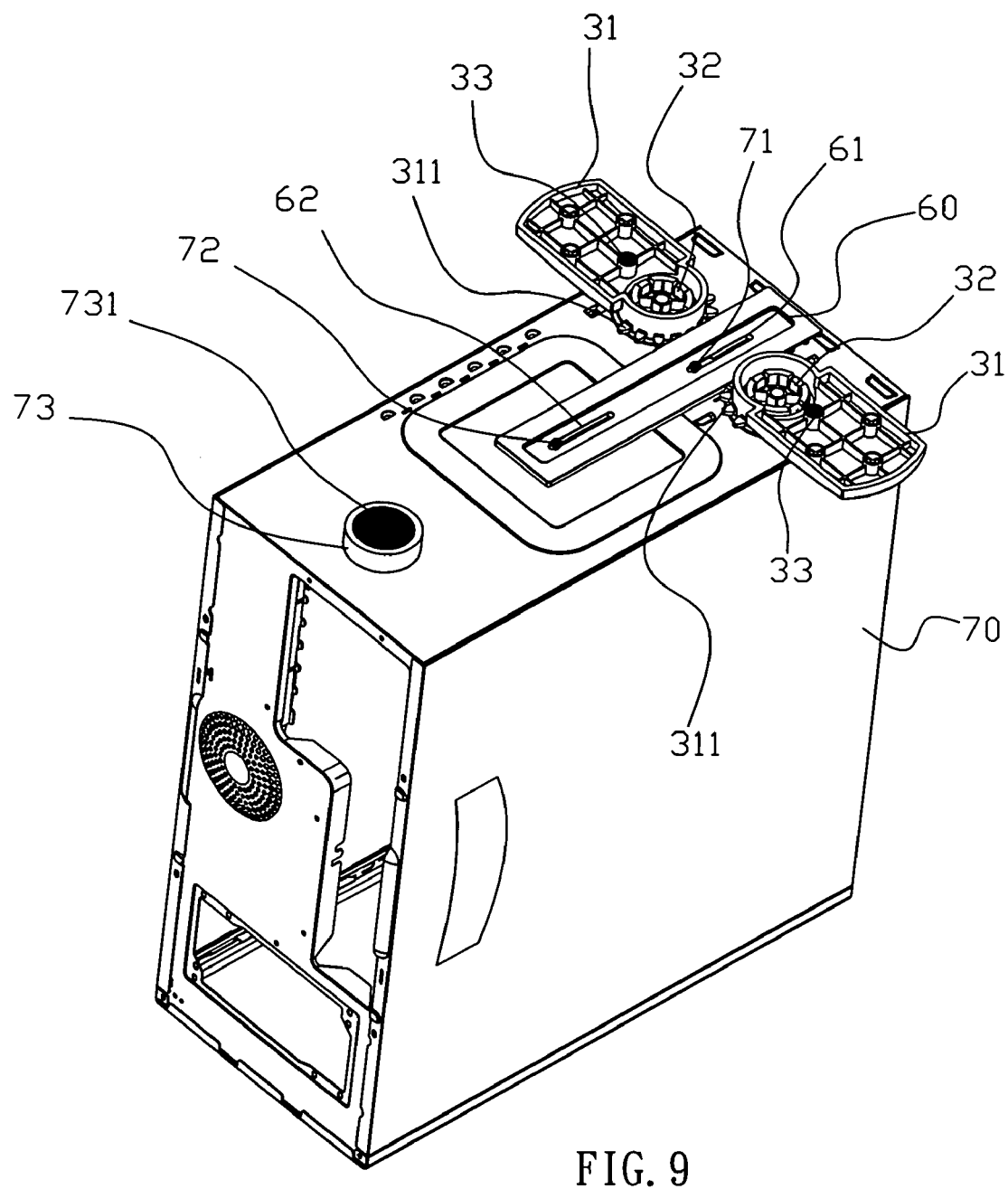
FIG. 9 is a prospective view, showing expanded foot seats combined with a housing of another preferred embodiment according to the present invention.

Please refer to FIG. 9. A linking rod 60 is allowed to have only a pair of racks and tow long holes 61 and 62 in a linkage mechanism for foot seats of another embodiment according to the present invention. The two racks are respectively engaged with the arc racks 311 of the two foot seats 31. Two shafts 32, two screws 71, 72 and a fixed foot seat 73 are respectively combined with the bottom face of a housing 70. When one of the foot seats 31 is rotated, the linking rod 60 can be driven to move and subsequently another foot seat 31 is driven to move to cause the two foot seats 31 to be extended or retreated. The screws 71 and 72 are respectively installed in the long holes 61 and 62 so as to limit and guide the range and the direction of the movement of the linking rod 60. The pads 33 and a pad 731 are respectively disposed at the bottom faces of the two foot seats 31 and the fixed foot seat 73 to allow the contacts between the foot seats 31 and the fixed foot seat 73 to be more stable.

The corresponding guide elements such as the long holes of the linking rod and the screws in the present invention can be replaced with other concave and convex matching guide elements.

The linkage mechanism according to the present invention can allow the adjustment of foot seats below a housing of an electronic product such as a computer or server to be more convenient. Only one of the foot seats is rotated, other foot seats can be driven to rotate to proper positions at the same time; a user doesn't need to rotate each foot seat individually so that the time for rotating the foot seats is much saved. Besides, when the placement of a housing is limited, it is inconvenient a user's hand to touch and rotate a certain foot seats, the user still can use the hand to rotate the foot seat that is convenient to touch to drive further the other inconveniently touched foot seats to rotate to proper positions. This can allow the adjustment of the foot seats to be more unlimited.

It is noted that the linkage mechanism for foot seats described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A linkage mechanism for foot seats, comprising at least two shafts and two guide elements combined at the bottom of a housing, a foot seat being pivotally connected to each said shaft, an arc rack being disposed at a relative end of each said foot seat, a rack being disposed at each one of two sides of a linking rod corresponding to said arc rack of each said foot seat; said racks being respectively engaged with said arc rack of each said foot seat; wherein, when one of said foot seats is rotated, said linking rod being driven to move and said other foot seats being then further driven to rotate, guide elements corresponding to said guide elements on said housing being disposed in said linking rod so as to cause the movement of said linking rod to be limited by said guide elements.

2. The linkage mechanism according to claim 1, wherein said guide elements on the bottom of said housing are screws and said guide elements in said linking rod are long holes, each said long hole is engaged with said corresponding screw at the lower part of a head portion of said screw.

3. The linkage mechanism according to claim 2, wherein three screws are disposed on the bottom of said housing and three long holes are disposed in said linking rod.

4. The linkage mechanism according to claim 1, wherein two said shafts and a fixed foot seat are disposed on the bottom of said housing.

5. The linkage mechanism according to claim 4, wherein pads are respectively disposed on the bottoms of said foot seats and the bottom of said fixed foot seat.

6. The linkage mechanism according to claim 4, wherein said guide elements on the bottom of said housing are screws and said guide elements in said linkage rod are long holes, each said long hole is engaged with said corresponding screw at the lower part of a head portion of said screw; two screws are disposed on the bottom of said housing and two long holes are disposed in said linking rod.

7. The linkage mechanism according to claim 1, wherein four said shafts are disposed on the bottom of said housing.

8. The linkage mechanism according to claim 1, wherein a pad is disposed on the bottom of each said foot seat.

9. The linkage mechanism according to claim 1, wherein a plate is installed in said linkage rod, one side face of each said rack is shielded by said plate.

* * * * *